(12) United States Patent
Sato

(10) Patent No.: US 10,215,078 B2
(45) Date of Patent: Feb. 26, 2019

(54) EBULLIENT COOLING DEVICE

(71) Applicant: TOYOTA JIDOSHA KABUSHIKI KAISHA, Toyota-shi, Aichi-ken (JP)

(72) Inventor: Masahiro Sato, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 467 days.

(21) Appl. No.: 14/837,371

(22) Filed: Aug. 27, 2015

(65) Prior Publication Data

US 2016/0115855 A1   Apr. 28, 2016

(30) Foreign Application Priority Data

Oct. 27, 2014   (JP) ................. 2014-218534

(51) Int. Cl.
| | |
|---|---|
| *F01P 3/22* | (2006.01) |
| *F02G 5/04* | (2006.01) |
| *F01P 7/16* | (2006.01) |
| *F02G 5/02* | (2006.01) |

(52) U.S. Cl.
CPC .......... *F01P 3/2271* (2013.01); *F01P 3/2207* (2013.01); *F02G 5/04* (2013.01); F01P 3/2285 (2013.01); F01P 7/16 (2013.01); F01P 7/162 (2013.01); F01P 2003/2214 (2013.01); F01P 2003/2264 (2013.01); F01P 2025/04 (2013.01); F01P 2025/30 (2013.01); F02G 5/02 (2013.01); F02G 2260/00 (2013.01); Y02T 10/166 (2013.01)

(58) Field of Classification Search
CPC ................... F01P 3/2271; F01P 3/2207; F01P 2003/2214; F01P 2003/2264; F01P 3/2285

USPC ....................................... 123/41.21
See application file for complete search history.

(56) References Cited

U.S. PATENT DOCUMENTS

| | | | |
|---|---|---|---|
| 4,788,943 A | 12/1988 | Hayashi | |
| 2013/0319097 A1* | 12/2013 | Yamashita | ............... F01P 3/22 73/114.68 |
| 2013/0327133 A1 | 12/2013 | Yamashita | |

FOREIGN PATENT DOCUMENTS

| | | |
|---|---|---|
| CN | 103534445 A | 1/2014 |
| JP | S61-275522 A | 12/1986 |
| JP | 2008-248703 A | 10/2008 |
| JP | 5003725 B2 | 8/2012 |
| JP | 5812159 B1 | 11/2015 |
| JP | 2016-3599 A | 1/2016 |
| WO | 2012/110892 A2 | 8/2012 |

\* cited by examiner

*Primary Examiner* — Lindsay Low
*Assistant Examiner* — Omar Morales
(74) *Attorney, Agent, or Firm* — Hunton Andrews Kurth LLP

(57) ABSTRACT

A pressure relief valve is opened from a first time to a second time for the purpose of reducing the pressure in the gas phase in a gas-liquid separator. A first water pump (WP) is driven at a third time and a fourth time. The third time and fourth time correspond to timings at which a difference between a boiling temperature and an actual temperature becomes equal to or greater than a predetermined temperature. Since liquid-phase coolant in a catch tank can be fed to another water pump by driving the first WP, the actual temperature of the liquid-phase coolant immediately upstream of the other water pump can be lowered. It is thus possible to prevent intense boiling of the liquid-phase coolant immediately upstream of the other water pump.

12 Claims, 9 Drawing Sheets

EBULLIENT COOLING DEVICE

CROSS-REFERENCE TO RELATED APPLICATION

The present application claims priority to Japanese Patent Application No. 2014-218534 filed on Oct. 27, 2014, which is incorporated herein by reference in its entirety.

BACKGROUND

Field of the Invention

This invention relates to an ebullient cooling device.

Background Art

An ebullient cooling device that performs cooling in an internal combustion engine by utilizing boiling/evaporative heat of a coolant that is caused to flow in a coolant passage (for example, a water jacket) that is formed inside the internal combustion engine has already been disclosed in, for example, Japanese Patent Laid-Open No. 2008-248703 or Japanese Patent Laid-Open No. 61-275522. In the aforementioned ebullient cooling devices, the coolant passage constitutes one part of a closed circuit that circulates a coolant, and a condenser and a water pump are provided partway along the closed circuit. A gas-phase coolant that is discharged from the coolant passage is cooled by the condenser and returns to a liquid-phase coolant which is then fed to the coolant passage by the water pump.

Further, Japanese Patent No. 5003725 discloses an ebullient cooling device that includes, between a coolant passage and a condenser, a gas-liquid separator that separates coolant that is discharged from the coolant passage into gas-phase coolant and liquid-phase coolant. In this ebullient cooling device, the coolant passage, the gas-liquid separator and a first water pump constitute one part of a closed circuit that circulates a coolant. The liquid-phase coolant inside the gas-liquid separator is fed to the coolant passage by the first water pump. Furthermore, in this ebullient cooling device, the condenser constitutes one part of another closed circuit that circulates coolant between the condenser and the gas-liquid separator. The gas-phase coolant that is separated by the gas-liquid separator is cooled by the condenser and returns to a liquid-phase coolant, and is then fed to the gas-liquid separator by a second water pump.

In the ebullient cooling device described in Japanese Patent No. 5003725, if the pressure inside the gas-liquid separator is rapidly decreased, in some cases intense boiling will occur with respect to the liquid-phase coolant inside the gas-liquid separator. In this case, because the gas-liquid separator is connected to the first water pump, if intense boiling occurs in the liquid-phase coolant inside the gas-liquid separator, there is a possibility that intense boiling will also occur in the liquid-phase coolant that is immediately upstream of the first water pump. If intense boiling occurs in the liquid-phase coolant that is immediately upstream of the first water pump, the first water pump will run idle and there will be a decrease in the flow rate of the coolant that should be fed into the coolant passage from the first water pump, and hence the problem of insufficient cooling of the engine will arise.

SUMMARY

The present invention has been made to solve the above described problem. That is, an object of the present invention is to prevent intense boiling occurring immediately upstream of a water pump that feeds a liquid-phase coolant to a coolant passage that is formed inside an internal combustion engine.

A first invention is an ebullient cooling device, comprising:

a coolant passage that is formed inside an internal combustion engine;

a gas-liquid separator that separates a coolant that is discharged from the coolant passage into a liquid-phase coolant and a gas-phase coolant;

a condenser that returns the gas-phase coolant that is separated at the gas-liquid separator to a liquid-phase coolant;

a first passage that connects the condenser and the coolant passage;

a second passage that branches from the first passage at a location partway along the first passage, and is connected to the gas-liquid separator;

a first water pump that is provided between a connection portion that connects the first passage and the second passage, and the coolant passage, and that feeds a liquid-phase coolant from the first passage to the coolant passage during operation of the internal combustion engine;

a second water pump that is provided between the connection portion and the condenser;

actual temperature measurement means that is provided in the second passage, or in the first passage between the connection portion and the coolant passage, and is used for measuring an actual temperature of a liquid-phase coolant;

boiling temperature calculation means for calculating a boiling temperature of a liquid-phase coolant that is fed from the first water pump to the coolant passage based on a pressure of a gas-phase coolant in the gas-liquid separator; and coolant feeding means for, in a case where the actual temperature is higher than the boiling temperature, driving the second water pump to feed a liquid-phase coolant from the condenser to the first water pump.

A second invention is the ebullient cooling device according to the first invention, further comprising recovery means for recovering thermal energy of a gas-phase coolant that is separated at the gas-liquid separator.

A third invention is the ebullient cooling device according to the second invention, further comprising:

a third passage that connects the gas-liquid separator and the condenser, and that feeds a gas-phase coolant from an upper portion of the gas-liquid separator to the condenser via the recovery means;

a fourth passage that connects the gas-liquid separator and the condenser, and that feeds a liquid-phase coolant to the condenser from a lower portion of the gas-liquid separator;

a control valve that is provided in the fourth passage and that opens and closes the fourth passage; and coolant leak means for, in a case where a liquid level of a liquid-phase coolant in the gas-liquid separator rises to a first position that is lower than a connection location with the third passage and is higher than a connection location with the fourth passage, controlling the control valve so as to open the fourth passage and feed the liquid-phase coolant from the gas-liquid separator to the condenser.

A fourth invention is the ebullient cooling device according to the third invention, further comprising coolant replenishment means for, in a case where the liquid level of a liquid-phase coolant in the gas-liquid separator decreases to a second position that is below the first position, driving the second water pump to feed a liquid-phase coolant from the condenser to the gas-liquid separator.

A fifth invention is the ebullient cooling device according to any one of the first to the fourth invention, wherein the actual temperature measurement means is provided in the first passage between the connection portion and the coolant passage.

A sixth invention is the ebullient cooling device according to any one of the first to the fifth invention, wherein the coolant feeding means drives the second water pump in a case where the actual temperature is higher than the boiling temperature by a predetermined amount or more.

According to the first invention, in a case where the actual temperature of a liquid-phase coolant that is measured in a second passage or in the first passage that is between the connection portion and the coolant passage is higher than a boiling temperature of a liquid-phase coolant that is fed from a first water pump to a coolant passage, a second water pump can be driven to feed liquid-phase coolant from the condenser to the first water pump. Therefore, intense boiling of the liquid-phase coolant that is immediately upstream of the first water pump can be prevented.

According to the second invention, thermal energy of a gas-phase coolant that is separated by a gas-liquid separator can be recovered. It is therefore possible to improve the fuel consumption of an internal combustion engine.

According to the third invention, in a case where the liquid level of the liquid-phase coolant in the gas-liquid separator rises to a first position that is below a connection location with a third passage and is above a connection location with a fourth passage, a control valve is controlled so as to open the fourth passage so that the liquid-phase coolant can be fed to the condenser from the gas-liquid separator. Therefore, it is possible to allow liquid-phase coolant to leak from the gas-liquid separator and thereby prevent the liquid-phase coolant overflowing from the gas-liquid separator and flowing into the third passage or recovery means.

According to the fourth invention, in a case where the liquid level of the liquid-phase coolant in the gas-liquid separator decreases to a second position that is below the first position, a second water pump can be driven to feed liquid-phase coolant from the condenser to the gas-liquid separator. Accordingly, liquid-phase coolant can be replenished into the gas-liquid separator to thereby prevent an excessive decrease in the liquid-phase coolant inside the gas-liquid separator.

According to the fifth invention, since actual temperature measurement means is provided in a first passage between the connection portion and the coolant passage, the actual temperature of the liquid-phase coolant that is fed from the first water pump to the coolant passage can be accurately measured.

According to the sixth invention, since the second water pump is driven in a case where the actual temperature is higher than the boiling temperature by a predetermined amount or more, it is possible to keep the frequency of feeding water by means of the second water pump to a minimum and to maintain the temperature of the liquid-phase coolant that is fed into the coolant passage from the first water pump in the vicinity of the boiling point. It is thereby possible to facilitate boiling of the liquid-phase coolant inside the coolant passage.

DETAILED DESCRIPTION OF THE PREFERRED EMBODIMENTS

Figure 1:
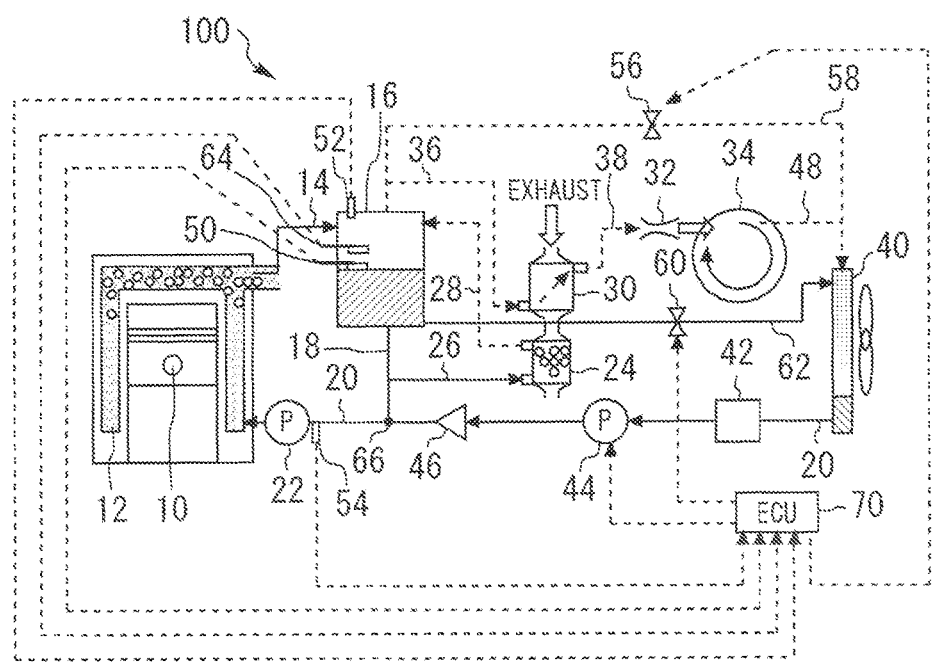
FIG. 1 is a view for describing the configuration of an ebullient cooling device 100 according to one embodiment.

Embodiments of the present invention are described hereunder while referring to FIG. 1 to FIG. 12. Note that elements that are common to the respective drawings are denoted by the same reference characters and a duplicate description thereof is omitted hereunder. Further, the present invention is not limited to the embodiments described hereunder.

[Description of Device Configuration]

FIG. 1 is a view for describing the configuration of an ebullient cooling device 100 according to one embodiment. As shown in FIG. 1, the ebullient cooling device 100 includes a coolant passage 12 that is formed inside an engine 10 as an internal combustion engine. The engine 10 is cooled as a result of coolant that circulates through the coolant passage 12 receiving the heat of the engine 10 and boiling. Although the coolant passage 12 is a water jacket that is formed around cylinders of the engine 10, the coolant passage 12 is not particularly limited thereto as long as the coolant passage 12 allows coolant to circulate through the inside of the engine 10. The coolant that is circulated through the inside of the coolant passage 12 is not particularly limited as long as the coolant receives heat of the engine 10 and boils.

The coolant passage 12 is connected to a gas-liquid separator 16 through a coolant passage 14. The coolant passage 14 is connected to an outlet of the coolant passage 12 that is formed in an upper portion of a cylinder block of the engine 10, and is constituted by a pipe or hose that is capable of withstanding high temperatures and high pressure. The gas-liquid separator 16 is configured so as to separate coolant that is discharged from the coolant passage 12 and flows into the gas-liquid separator 16 into liquid-phase coolant and gas-phase coolant. The gas-liquid separator 16 is connected to a coolant passage 20 through a coolant passage 18. The coolant passage 20 is connected to an inlet of the coolant passage 12 that is formed at a lower portion of the cylinder block of the engine 10.

A WP (water pump) 22 is provided in the coolant passage 20 at a position between a connection portion 66 at which the coolant passage 18 connects with the coolant passage 20, and the coolant passage 12. Although the WP 22 is a mechanical pump that adopts a crankshaft of the engine 10 as a driving source, an electric motor-driven centrifugal pump can also be used. One part of the liquid-phase coolant that is separated by the gas-liquid separator 16 flows into the WP 22 via the coolant passages 18 and 20, and is fed to the coolant passage 12 by driving of the WP 22.

The ebullient cooling device 100 also includes an exhaust heat steam generator 24. The exhaust heat steam generator 24 is provided in an exhaust passage (not illustrated in the drawings) of the engine 10. The exhaust heat steam generator 24 is connected to the gas-liquid separator 16 through coolant passages 18 and 26 and a coolant passage 28. When liquid-phase coolant that is separated at the gas-liquid separator 16 flows into the exhaust heat steam generator 24 via the coolant passages 18 and 26, one part thereof is converted into steam by exhaust heat. The liquid-phase coolant in which steam is mixed flows into the gas-liquid separator 16 via the coolant passage 28 from the exhaust heat steam generator 24. The coolant that flows into the gas-liquid separator 16 from the coolant passage 28 is separated into liquid-phase coolant and gas-phase coolant at the gas-liquid separator 16.

Further, the ebullient cooling device 100 includes a superheater 30, a supersonic nozzle 32 and a turbine 34. The superheater 30 is provided on an upstream side relative to the exhaust heat steam generator 24 of the aforementioned exhaust passage. The superheater 30 is connected to the gas-liquid separator 16 through a coolant passage 36 whose inlet is arranged at an upper portion of the gas-liquid separator 16. When gas-phase coolant that is separated by the gas-liquid separator 16 flows into the superheater 30 via the coolant passage 36, the gas-phase coolant is converted into superheated steam by exhaust heat. The superheated steam flows into the supersonic nozzle 32 via the coolant passage 38, and is jetted into the turbine 34. The turbine 34 rotates when the superheated steam is jetted therein. A power generator (not illustrated in the drawings) is connected to the turbine 34. Therefore, electricity is generated at the power generator when the turbine 34 rotates. The generated electricity is stored in a storage battery (not illustrated in the drawings). Note that a configuration may also be adopted in which a reduction gear (not illustrated in the drawings) is connected to the turbine 34 so that the engine 10 is assisted through the reduction gear.

The ebullient cooling device 100 also includes a condenser 40, a catch tank 42 and a WP 44. The condenser 40 is connected to the turbine 34 through a coolant passage 48. Gas-phase coolant that flows into the condenser 40 from the turbine 34 via the coolant passage 48 is cooled at the condenser 40 and returned to liquid-phase coolant, and is temporarily stored in the catch tank 42. The WP 44 is an electric motor-driven pump for feeding liquid-phase coolant that is stored in the catch tank 42 into the coolant passage 20, and is configured to be capable of feeding liquid-phase coolant from a low-pressure region (for example, 10 to 20 kPaG) to a normal-pressure region (for example, 100 kPaG).

As described in detail later, control to switch driving (normal mode) of the WP 44 on or off is performed based on an on/off signal from a level sensor 50 that detects the liquid level height of the liquid-phase coolant in the gas-liquid separator 16. Further, control to switch driving (boiling mode) of the WP 44 on or off is performed based on an output of a pressure measuring portion (for example, a pressure sensor) 52 that measures the pressure inside the gas-liquid separator 16, and an output of a temperature measuring portion (for example, a temperature sensor) 54 that measures the temperature of the liquid-phase coolant that flows into the WP 22. Note that, in the gas-liquid separator 16, the pressure measuring portion 52 is provided at an upper portion relative to a level sensor 64 that is described later. The temperature measuring portion 54 is provided in the coolant passage 20 at a position that is immediately upstream of the WP 22.

When the WP 44 is driven, the liquid-phase coolant inside the catch tank 42 is fed to various devices from the coolant passage 20. Specifically, liquid-phase coolant inside the catch tank 42 is fed to the WP 22 via the coolant passage 20, is fed to the gas-liquid separator 16 via the coolant passage 20, the connection portion 66 and the coolant passage 18, and is fed to the exhaust heat steam generator 24 via the coolant passage 20, the connection portion 66, and the coolant passages 18 and 26.

The ebullient cooling device 100 further includes a check valve 46. By providing the check valve 46, a back-flow of liquid-phase coolant from the connection portion 66 side to the WP 44 side is prevented.

As described above, the liquid-phase coolant receives waste heat from the engine 10 in the engine 10, the exhaust heat steam generator 24 and the superheater 30, and is converted to high-temperature, high-pressure gas-phase coolant. The power generator or storage battery connected to the turbine 34 converts thermal energy that the gas-phase coolant has received to electrical energy to thereby recover the energy. In a case where a reduction gear is connected to the turbine 34, the reduction gear recovers the thermal energy of the gas-phase coolant as mechanical power. It is possible to improve the fuel consumption of the engine 10 by recovering such thermal energy. After passing through the turbine 34, the gas-phase coolant is returned to liquid-phase coolant again in the condenser 40, and is then fed to the engine 10, the exhaust heat steam generator 24 and the superheater 30 by driving of the WPs 22 and 44. Thus, the ebullient cooling device 100 functions as a Rankine cycle system.

The ebullient cooling device 100 also includes a pressure relief valve 56 for decreasing the pressure in the gas phase in the gas-liquid separator 16. The pressure relief valve 56 is, for example, an electromagnetic valve, and is provided in a coolant passage 58 that bypasses the superheater 30, the supersonic nozzle 32 and the turbine 34 and connects the gas-liquid separator 16 to the condenser 40. When the pressure relief valve 56 is opened, gas-phase coolant in the gas-liquid separator 16 flows into the condenser 40 via the coolant passage 58 without passing through the superheater 30 and the like, and as a result the pressure inside the gas-liquid separator 16 decreases.

The ebullient cooling device 100 also includes a control valve 60 for leaking the liquid-phase coolant inside the gas-liquid separator 16 into the condenser 40. The control valve 60 is, for example, an electromagnetic valve, and is connected to the condenser 40 through a coolant passage 62 whose inlet is arranged at a lower portion of the gas-liquid separator 16. Control to switch driving of the control valve 60 on or off is performed based on an on/off signal from the level sensor 64 that is provided at an upper position relative to the level sensor 50 and that detects the liquid level height of the liquid-phase coolant in the gas-liquid separator 16 (the control of the control valve 60 is described in detail later). When the control valve 60 is opened, the liquid-phase coolant of the gas-liquid separator 16 flows into the condenser 40 via the coolant passage 62.

The ebullient cooling device 100 also includes an ECU (electronic control unit) 70. The ECU 70 includes at least an input/output interface, a memory, and a CPU. The input/output interface is provided in order to take in sensor signals from various sensors, and to output actuating signals to various actuators. The sensors from which the ECU 70 takes in signals include the level sensors 50 and 64, the pressure measuring portion 52 and the temperature measuring portion 54. The actuators to which the ECU 70 outputs actuating signals include the WP 44, the pressure relief valve 56 and the control valve 60. Various control programs and various kinds of maps and the like are stored in the memory. The CPU reads out a control program or the like from the memory and executes the control program or the like, and generates actuating signals based on sensor signals that were taken in by the ECU 70.

[Features of Embodiment]

Control performed by the ECU 70 includes control of driving of the WP 44 (control in a normal mode and in a boiling mode), and opening/closing control with respect to the pressure relief valve 56 and the control valve 60. First, control of the WP 44 in the normal mode will be described. The control of the WP 44 in the normal mode by the ECU 70 is performed based on an on/off signal from the level sensor 50, and is performed for the purpose of supplying liquid-phase coolant from the catch tank 42 to replenish the gas-liquid separator 16 with liquid-phase coolant in a case where the liquid-phase coolant inside the gas-liquid separator 16 has decreased.

Figure 2:
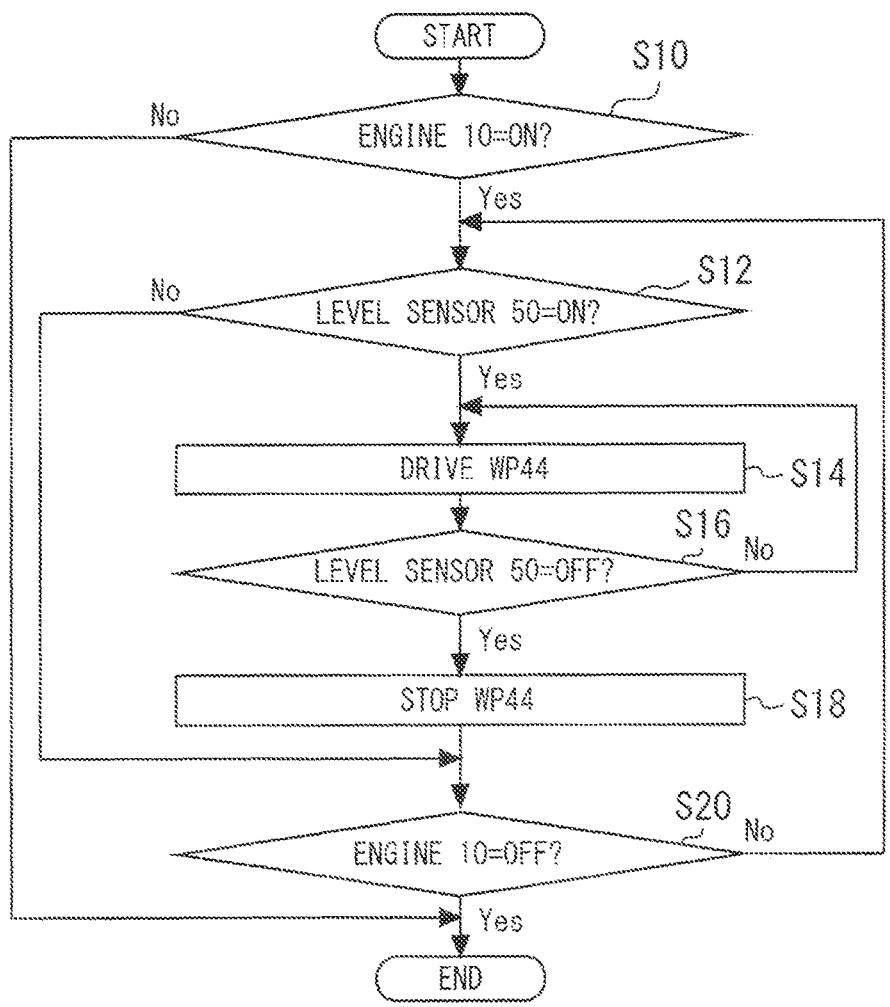
FIG. 2 is a flowchart illustrating a control routine for the normal mode of the WP 44.

FIG. 2 is a flowchart illustrating a control routine for the normal mode of the WP 44. In the routine shown in FIG. 2, first the ECU 70 determines whether or not operation of the engine 10 is "on" (step S10). The ECU 70 determines whether or not operation of the engine 10 is "on" by determining whether or not the coolant temperature inside the coolant passage 12 is equal to or higher than a predetermined temperature. The coolant temperature of the engine 10 may be obtained from a temperature sensor that is separately provided in the coolant passage 14 or the gas-liquid separator 16, or based on the output of the pressure measuring portion 52. If it is determined in the present step that operation of the engine 10 is not "on", the ECU 70 ends the present routine.

Figure 3:
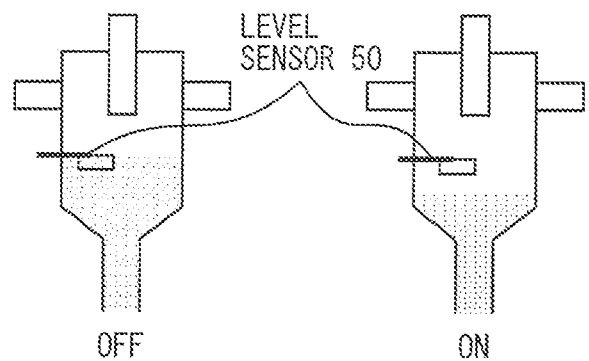
FIG. 3 is a view that illustrates an outline of an on/off function of the level sensor 50.

If it is determined in step S10 that operation of the engine 10 is "on", the ECU 70 determines whether or not the level sensor 50 is "on" (step S12). The ECU 70 determines whether or not the level sensor 50 is "on" based on an on/off signal from the level sensor 50. FIG. 3 is a view that illustrates an outline of an on/off function of the level sensor 50. As shown in FIG. 3, the level sensor 50 emits an "on" signal in a case where the liquid level height of liquid-phase coolant in the gas-liquid separator 16 is lower than the position of the level sensor 50, and the level sensor 50 emits an "off" signal in a case where the liquid level height is equal to or higher than the position of the level sensor 50. In the present step, if the "off" signal is detected, the ECU 70 proceeds to step S20.

In a case where an "on" signal is detected in step S12, the ECU 70 starts driving the WP 44 (step S14), and determines whether or not the level sensor 50 is "off" (step S16). If an "on" signal is detected in step S16, the ECU 70 returns to step S14. That is, driving of the WP 44 is continued until the liquid level height of the liquid-phase coolant in the gas-liquid separator 16 reaches a position that is equal to or higher than the position of the level sensor 50. If an "off" signal is detected in step S16, the ECU 70 stops driving the WP 44 (step S18), and proceeds to step S20.

In step S20, the ECU 70 determines whether or not operation of the engine 10 is "off". The ECU 70 determines whether or not operation of the engine 10 is "off" on the basis of whether or not the coolant temperature inside the coolant passage 12 is less than a predetermined temperature. The processing in the present step is the exact opposite to the processing in step S10. If it is determined in the present step that operation of the engine 10 is not "off", the ECU 70 returns to step S12. If it is determined in the present step that operation of the engine 10 is "off", the ECU 70 ends the present routine.

Next, control for opening/closing the pressure relief valve 56 will be described. The control for opening/closing the pressure relief valve 56 that is performed by the ECU 70 is performed for the purpose of reducing the pressure in the gas phase of the gas-liquid separator 16. Specifically, this control closes the pressure relief valve 56 in a case where the pressure in the gas phase of the gas-liquid separator 16 is less than a pressure in a normal to high pressure region (for example, 100 to 200 kPaG), and opens the pressure relief valve 56 in a case where the pressure in the gas phase is equal to or greater than a predetermined pressure (for example, 200 kPaG). Note that the pressure in the gas phase of the gas-liquid separator 16 is detected by the pressure measuring portion 52 or by a pressure sensor provided separately in the coolant passage 58 on an upstream side (gas-liquid separator 16 side) relative to the pressure relief valve 56.

Figure 4:
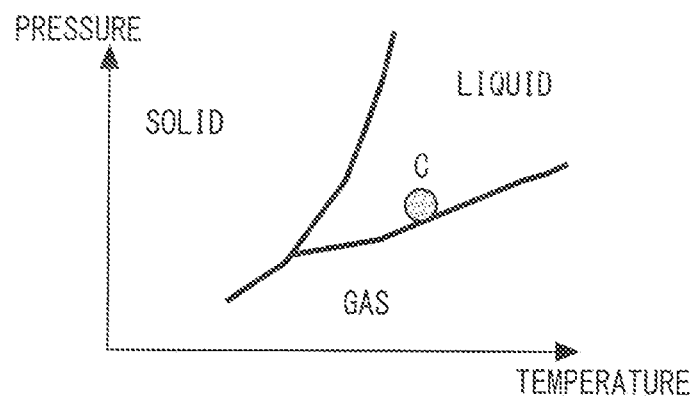
FIG. 4 is a three-phase diagram with respect to the coolant.

Next, control in a boiling mode of the WP 44 will be described. FIG. 4 is a three-phase diagram with respect to the coolant. As shown in FIG. 4, the state of the coolant depends on the pressure and temperature. In order to maintain a liquid state C that is shown in FIG. 4, it is necessary to lower the temperature if the pressure is constant, or to raise the pressure if the temperature is constant. Further, a boundary line between liquid and gas that is shown in FIG. 4 represents a saturated vapor pressure curve, and shows that the temperature at which the coolant boils (hereunder, referred to as "boiling temperature") varies according to the pressure.

Since the pressure in the coolant passage 58 on the downstream side (condenser 40 side) relative to the pressure relief valve 56 is equal to or less than the normal pressure, if the pressure relief valve 56 is opened, the inside of the gas-liquid separator 16 will be rapidly depressurized. If the inside of the gas-liquid separator 16 is rapidly depressurized, the boiling temperature of the liquid-phase coolant inside the gas-liquid separator 16 will rapidly decrease. If the boiling temperature of the liquid-phase coolant inside the gas-liquid separator 16 becomes less than the actual temperature of the liquid-phase coolant (hereunder, referred to as "actual temperature") that is fed to the coolant passage 12, the liquid-phase coolant inside the gas-liquid separator 16 will boil. Further, if a difference between the boiling temperature of the liquid-phase coolant inside the gas-liquid separator 16 and the actual temperature is large, the liquid-phase coolant inside the gas-liquid separator 16 will boil intensely.

Figure 5:
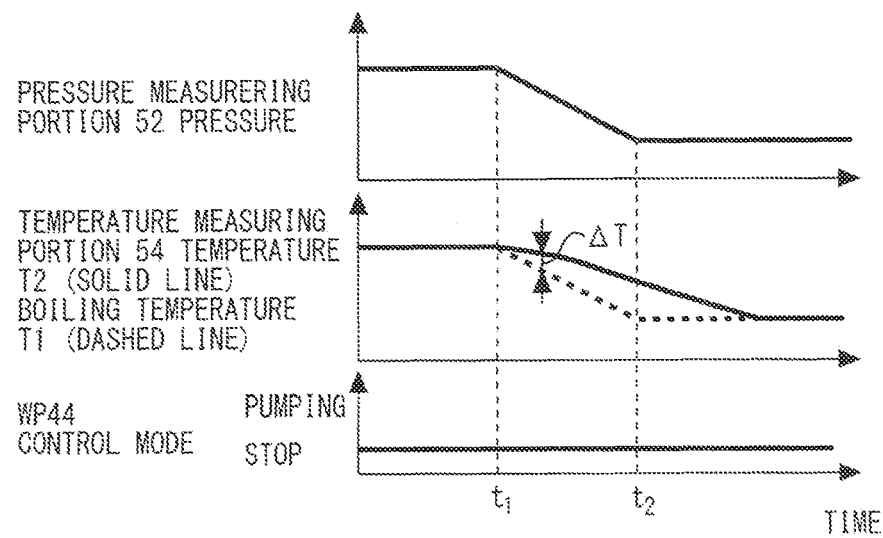
FIG. 5 is a view for describing the boiling behavior of the liquid-phase coolant immediately upstream of the WP 22.

Such intense boiling of the liquid-phase coolant also occurs in a similar manner in the coolant passage 20 immediately upstream of the WP 22. The reason this occurs is that the coolant passage 20 is connected to the gas-liquid separator 16 through the coolant passage 18. FIG. 5 is a view for describing the boiling behavior of the liquid-phase coolant immediately upstream of the WP 22. It is assumed that the pressure relief valve 56 is open from a time $t_1$ to a time $t_2$. At such time, accompanying a decrease in the pressure inside the gas-liquid separator 16, a boiling temperature $T_1$ (dashed line) of the liquid-phase coolant that is immediately upstream of the WP 22 decreases. Further, when the boiling temperature $T_1$ becomes less than an actual temperature $T_2$ (temperature measuring portion 54 temperature: solid line) of the liquid-phase coolant that is immediately upstream of the WP 22, the liquid-phase coolant that is immediately upstream of the WP 22 boils. Further, if a difference $\Delta T$ between the actual temperature $T_2$ and the boiling temperature $T_1$ becomes large, the liquid-phase coolant that is immediately upstream of the WP 22 will boil intensely.

As illustrated in the above described FIG. 1, the gas-liquid separator 16 is provided at a position that is above the WP 22. Consequently, even if the liquid-phase coolant inside the gas-liquid separator 16 has boiled intensely, in some cases the boiling of the liquid-phase coolant that is immediately upstream of the WP 22 is relatively mild. In a case where boiling of the liquid-phase coolant that is immediately upstream of the WP 22 is relatively mild, although some variations arise in the flow rate of the liquid-phase coolant that is fed to the WP 22, such variations have little impact on the driving of the WP 22. However, in a case where the liquid-phase coolant that is immediately upstream of the WP 22 boils intensely in a similar manner to the liquid-phase coolant inside the gas-liquid separator 16, the flow rate of the liquid-phase coolant that is fed to the WP 22 drops significantly, and the WP 22 runs idle. If the WP 22 runs idle, the flow rate of the liquid-phase coolant that is fed to the coolant passage 12 will also drop significantly, and cooling of the engine 10 will be insufficient. The control in the boiling mode of the WP 44 is performed to prevent the occurrence of such a malfunction.

Figure 6:
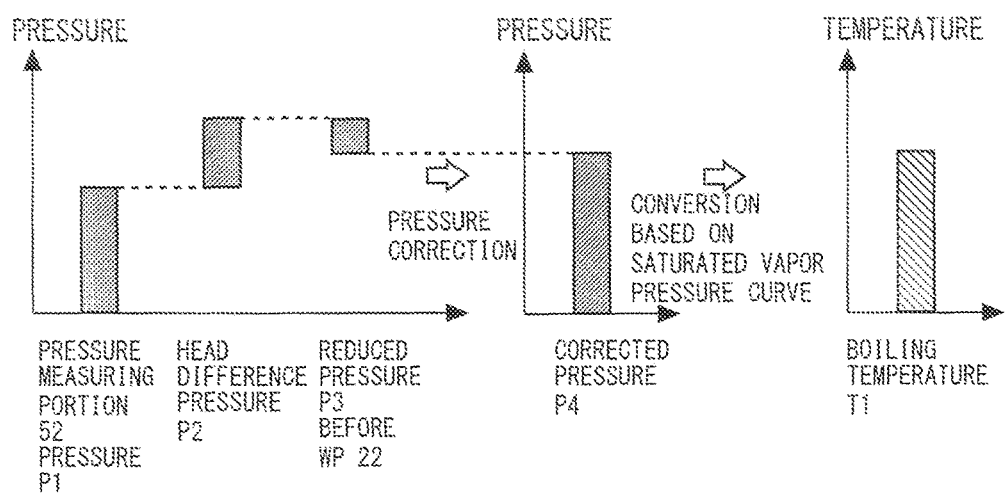
FIG. 6 is a view for describing a method for calculating the boiling temperature $T_1$ of the liquid-phase coolant that is immediately upstream of the WP 22.

The control in the boiling mode of the WP 44 will now be described in detail referring to FIG. 6 to FIG. 9. FIG. 6 is a view for describing a method for calculating the boiling temperature $T_1$ of the liquid-phase coolant that is immediately upstream of the WP 22. When calculating the boiling temperature $T_1$, first, as shown in FIG. 6, a pressure Pi that is measured by the pressure measuring portion 52 (that is, the pressure of the gas-phase coolant inside the gas-liquid separator 16) is corrected based on a pressure $P_2$ that is in accordance with a head difference (the term "head difference" refers to a height difference between the gas-liquid separator 16 and the WP 22; the same applies hereunder). The pressure $P_2$ that is in accordance with the head difference is expressed as the product of a specific gravity $\gamma$ of the coolant, a height difference h and a cross-sectional area A of the coolant passages 18 and 20 ($P_2 = \gamma \times h \times A$). Note that since the pressure $P_2$ virtually does not depend on the operational state of the engine 10, the pressure $P_2$ is incorporated as a constant.

Figure 7:
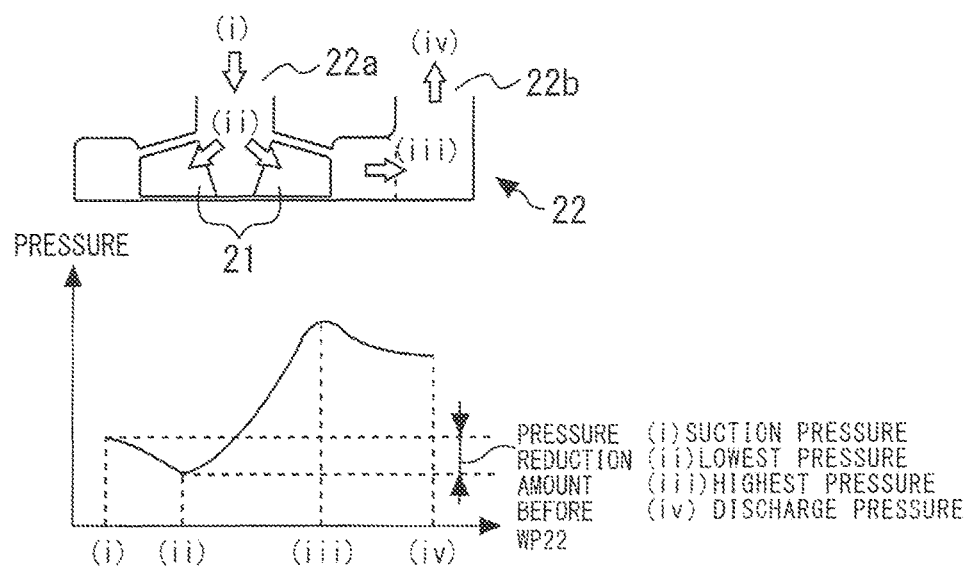
FIG. 7 is a view for describing changes in the pressure of the coolant inside the WP 22.

Further, as shown in FIG. 6, when calculating the boiling temperature $T_1$, correction of the pressure $P_1$ that is measured by the pressure measuring portion 52 is performed based on a pressure $P_3$ that is in accordance with a decrease in the pressure of the coolant inside the WP 22. FIG. 7 is a view for describing changes in the pressure of the coolant inside the WP 22. As shown in the upper section in FIG. 7, coolant that is sucked into an inlet portion 22a of the WP 22 is compressed accompanying rotation of a pump blade 21, and is discharged from an outlet portion 22b. Further, as shown in the lower section in FIG. 7, the pressure of the coolant that is sucked into the WP 22 becomes lowest at a position before the pump blade 21 (that is, a position (ii) in FIG. 7). The pressure $P_3$ corresponds to a difference between the suction pressure (i) and the lowest pressure (ii). The pressure $P_3$ depends on the rotational speed of the WP 22 (that is, the rotational speed of the engine 10).

Further, as shown in FIG. 6, the boiling temperature $T_1$ is calculated by correcting the pressure $P_1$ based on the pressure $P_2$ and the pressure $P_3$, and applying a pressure $P_4$ that is obtained after performing the aforementioned correction to the saturated vapor pressure curve. Note that, the pressure $P_2$ that is required for calculating the boiling temperature $T_1$, a map that shows the relation between the rotational speed of the WP 22 and the pressure $P_3$, and an arithmetic expression that approximates the saturated vapor pressure curve and the like are previously stored in the memory of the ECU 70.

Figure 8:
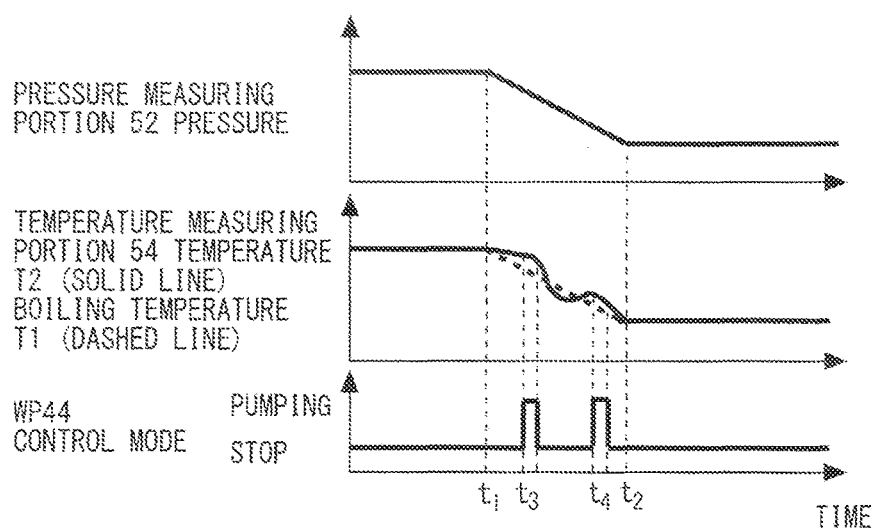
FIG. 8 is a timing chart for describing control in the boiling mode of the WP 44.

FIG. 8 is a timing chart for describing control in the boiling mode of the WP 44. A time $t_1$ and a time $t_2$ shown in FIG. 8 correspond to the respective timings shown in FIG. 5. As shown in FIG. 8, the WP 44 is driven at a time $t_3$ and a time $t_4$. The time $t_3$ and time $t_4$ correspond to timings at which the difference $\Delta T$ between the actual temperature $T_2$ and the boiling temperature $T_1$ becomes equal to or greater than a predetermined temperature $T_3$. Since the liquid-phase coolant in the catch tank 42 can be fed to the WP 22 by driving the WP 44, the actual temperature $T_2$ of the liquid-phase coolant that is immediately upstream of the WP 22 can be lowered thereby. It is thus possible to prevent intense boiling of the liquid-phase coolant immediately upstream of the WP 22. Note that the predetermined temperature $T_3$ is stored in advance in the memory of the ECU 70.

Figure 9:
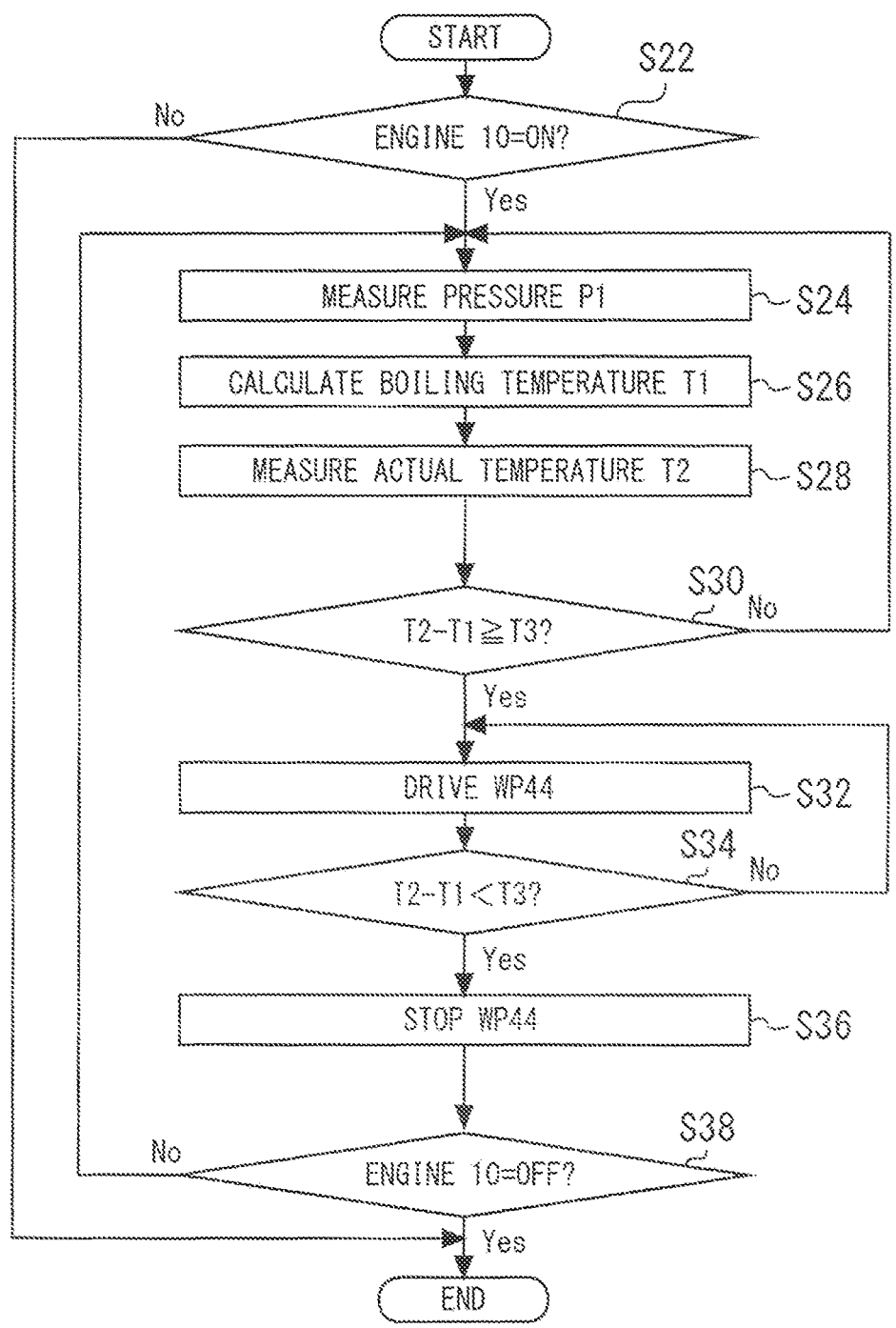
FIG. 9 is a flowchart illustrating a control routine in the boiling mode of the WP 44.

FIG. 9 is a flowchart illustrating a control routine in the boiling mode of the WP 44. The control routine illustrated in FIG. 9 is executed independently of the control routine illustrated in FIG. 2. In the routine illustrated in FIG. 9, first the ECU 70 determines whether or not operation of the engine 10 is "on" (step S22). The processing in the present step is the same as the processing in step S10 in FIG. 2. If it is determined in the present step that operation of the engine 10 is not "on", the ECU 70 ends the present routine.

In step S22, if it is determined that operation of the engine 10 is "on", the ECU 70 measures the pressure $P_1$ (step S24), calculates the boiling temperature $T_1$ (step S26), and measures the actual temperature $T_2$ (step S28). The pressure $P_1$ in step 824 is measured based on the output of the pressure measuring portion 52. The actual temperature $T_2$ in step S28 is measured based on the output of the temperature measuring portion 54. The method for calculating the boiling temperature $T_1$ in step S26 is the same as the method described above referring to FIG. 6.

Next, the ECU 70 determines whether or not the difference $\Delta T$ between the actual temperature $T_2$ and the boiling temperature $T_1$ is equal to or greater than the predetermined temperature $T_3$ (step S30). If the difference $\Delta T$ is less than the predetermined temperature $T_3$, the ECU 70 returns to the processing in step S24. If the difference $\Delta T$ is equal to or greater than the predetermined temperature $T_3$, the ECU 70 starts driving the WP 44 (step S32), and determines whether or not the difference $\Delta T$ between the actual temperature $T_2$ and the boiling temperature $T_1$ is less than the predetermined temperature $T_3$ (step S34). The processing in step S34 is exactly opposite to the processing in step S30. If it is determined in step S34 that the difference $\Delta T$ is equal to or greater that the predetermined temperature $T_3$, the ECU 70 returns to step S32. That is, driving of the WP 44 is continued until the difference $\Delta T$ becomes less than the predetermined temperature $T_3$.

When it is determined in step S34 that the difference $\Delta T$ is less than the predetermined temperature $T_3$, the ECU 70 stops driving the WP 44 (step S36), and determines whether or not operation of the engine 10 is "off" (step S38). The processing in the present step is the same as the processing in step S20 in FIG. 2. If it is determined in the present step that operation of the engine 10 is not "off", the ECU 70 returns to step S24. If it is determined in the present step that operation of the engine 10 is "off", the ECU 70 ends the present routine.

Lastly, opening/closing control with respect to the control valve 60 will be described. When the above described control in the boiling mode of the WP 44 is performed, since liquid-phase coolant is fed not just to the area immediately upstream of the WP 22 but also to the gas-liquid separator 16, the liquid level height of the liquid-phase coolant in the gas-liquid separator 16 rises. In a structure in which two passages that connect the gas-liquid separator 16 and the condenser 40 (that is, the coolant passages 36, 38, and 48 and the coolant passage 58) only allow gas-phase coolant to flow through, there is a possibility that executing control in the boiling mode of the WP 44 will result in liquid-phase coolant that overflows from the gas-liquid separator 16 flowing into the normal pressure system via the two passages. The opening/closing control with respect to the control valve 60 is performed to prevent the occurrence of such a malfunction.

Figure 10:
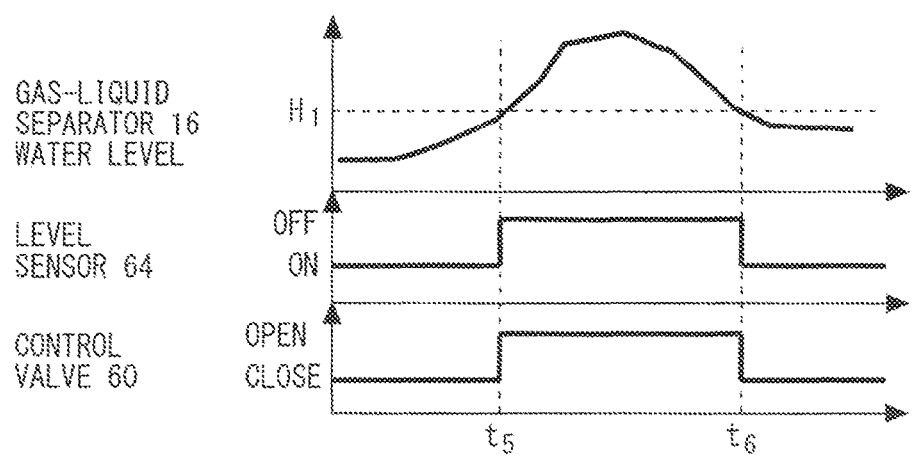
FIG. 10 is a timing chart for describing the opening/closing control with respect to the control valve 60.

FIG. 10 is a timing chart for describing the opening/closing control with respect to the control valve 60. At a time $t_5$, the liquid level height of the liquid-phase coolant of the gas-liquid separator 16 reaches a position $H_1$ that is the position of the level sensor 64. In this case, the specifications of the level sensor 64 are the same as the specifications of the level sensor 50 (see FIG. 3), and hence the level sensor 64 emits an "off" signal at the time $t_5$. The control valve 60 opens upon receiving the "off" signal, and liquid-phase coolant in the gas-liquid separator 16 is fed to the condenser 40 via the coolant passage 62. By this means, the liquid level height of the liquid-phase coolant of the gas-liquid separator 16 is decreased. Further, the level sensor 64 emits an "on" signal at a time $t_6$ at which the liquid level height becomes lower than the position $H_1$, and the control valve 60 closes upon receiving the "on" signal.

Figure 11:
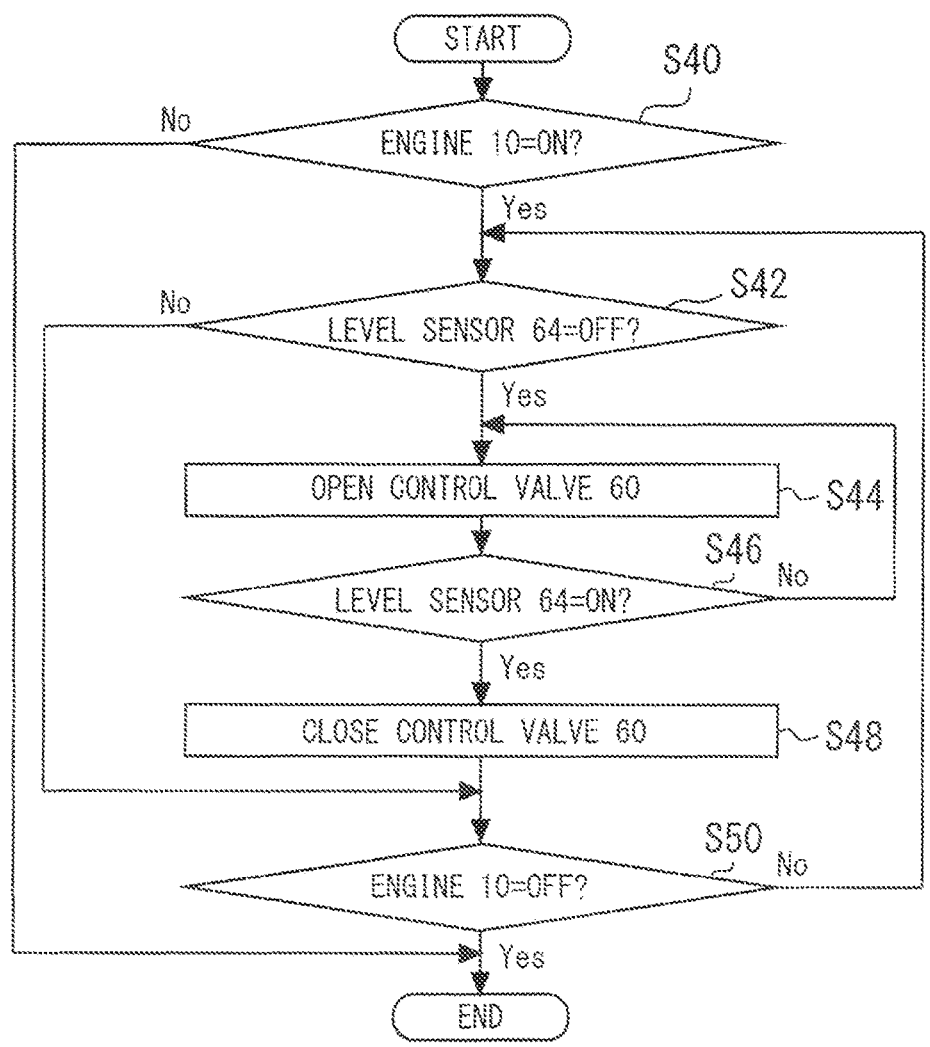
FIG. 11 is a flowchart illustrating a control routine for the control valve 60.

FIG. 11 is a flowchart illustrating a control routine for the control valve 60. The control routine illustrated in FIG. 11 is executed independently of the control routines illustrated in FIG. 2 and FIG. 9. In the routine illustrated in FIG. 11, first the ECU 70 determines whether or not operation of the engine 10 is "on" (step S40). The processing in the present step is the same as the processing in step S10 in FIG. 2. If it is determined in the present step that operation of the engine 10 is not "on", the ECU 70 ends the present routine.

If it is determined in step S40 that operation of the engine 10 is "on", the ECU 70 determines whether or not the level sensor 64 is "off" (step S42). The ECU 70 determines whether or not the level sensor 64 is "on" based on an on/off signal from the level sensor 64. In the present step, if an "on" signal is detected, the ECU 70 proceeds to step S50.

If an "off" signal is detected in step S42, the ECU 70 opens the control valve 60 (step S44), and determines whether or not the level sensor 64 is "on" (step S46). If an "off" signal is detected in step S46, the ECU 70 returns to step S44. That is, the open state of the control valve 60 is maintained until the liquid level height of the liquid-phase coolant of the gas-liquid separator 16 becomes lower than the position of the level sensor 64. When an "on" signal is detected in step S46, the ECU 70 closes the control valve 60 (step S48), and proceeds to step S50.

In step S50, the ECU 70 determines whether or not operation of the engine 10 is "off". The processing in the present step is the same as the processing in step S20 in FIG. 2. If it is determined in the present step that operation of the engine 10 is not "off", the ECU 70 returns to step S42. If it is determined in the present step that operation of the engine 10 is "off", the ECU 70 ends the present routine.

As described above, according to the present embodiment, the following advantageous effects can be obtained by various kinds of control during operation of the engine 10, that is, during ebullient cooling of the engine 10. Specifically, by the control in the normal mode of the WP 44, liquid-phase coolant from the catch tank 42 can be supplied to replenish the gas-liquid separator 16. Further, the pressure in the gas phase of the gas-liquid separator 16 can be prevented from becoming an extremely high pressure by the control for opening/closing the pressure relief valve 56. In addition, since liquid-phase coolant in the catch tank 42 can be supplied to the area immediately upstream of the WP 22 by the control in the boiling mode of the WP 44, intense boiling of liquid-phase coolant in the area immediately upstream of the WP 22 can be prevented. Furthermore, liquid-phase coolant that overflows from the gas-liquid separator 16 can be prevented from flowing into the normal pressure system via two passages by the control for opening/closing the control valve 60.

Note that, in the above described embodiment, the coolant passage 12 corresponds to "coolant passage" in the above described first invention, the engine 10 corresponds to "internal combustion engine" in the first invention, the coolant passage 20 corresponds to "first passage" in the first invention, the coolant passage 18 corresponds to "second passage" in the first invention, the WP 22 corresponds to "first water pump" in the first invention, the WP 44 corresponds to "second water pump" in the first invention, and the temperature measuring portion 54 corresponds to "actual temperature measurement means" in the first invention.

Further, in the above described embodiment, "boiling temperature calculation means" in the above described first invention is realized by the ECU 70 executing the processing in steps S24 and S26 in FIG. 9, and "coolant feeding means" in the first invention is realized by the ECU 70 executing the processing in step S32 in FIG. 9.

Furthermore, in the above described embodiment, the superheater 30, supersonic nozzle 32, turbine 34, power generator and storage battery correspond to "recovery means" in the above described second invention.

In addition, in the above described embodiment, the coolant passages 36, 38 and 48 correspond to "third passage" in the above described third invention, the coolant passage 62 corresponds to "fourth passage" in the third invention, and the position of the level sensor 64 corresponds to "first position" in the third invention.

Further, in the above described embodiment, "coolant leak means" in the above described third invention is realized by the ECU 70 executing the processing in step S44 in FIG. 11.

In addition, in the above described embodiment, the position of the level sensor 50 corresponds to "second position" in the above described fourth invention.

Furthermore, in the above described embodiment, "coolant replenishment means" in the above described fourth invention is realized by the ECU 70 executing the processing in step S14 in FIG. 2.

Figure 12:
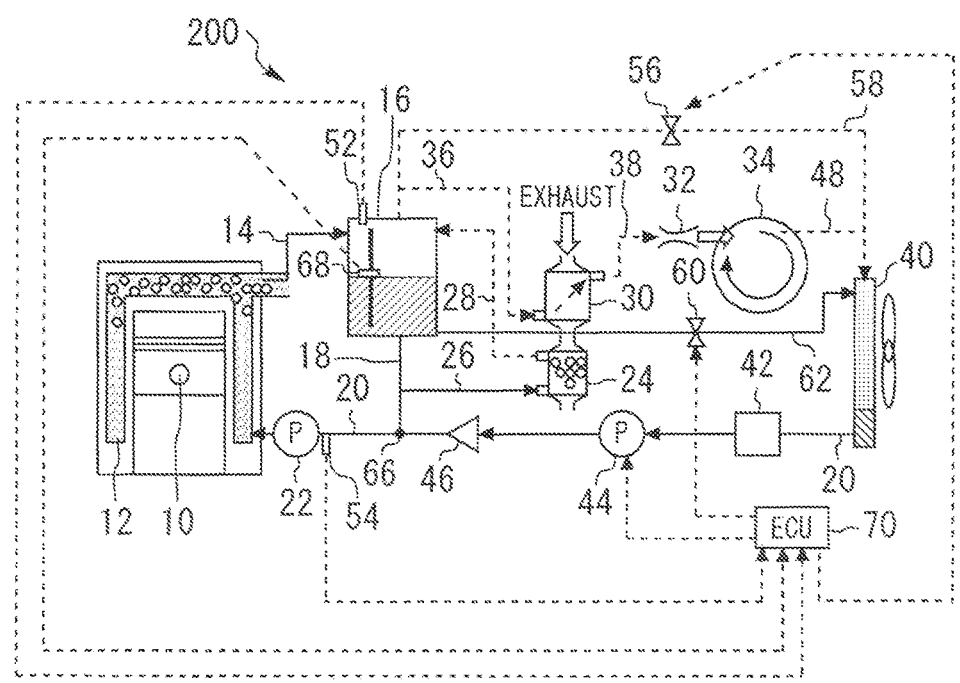
FIG. 12 is a view that illustrates the configuration of another ebullient cooling device 200 that can be applied to the present invention.

In this connection, in the above described embodiment, control in the normal mode of the WP 44 and control for opening/closing the control valve 60 are performed based on on/off signals from the respective level sensors 50 and 64. However, the aforementioned controls may also be performed based on signals from a single level sensor in which the functions of the level sensors 50 and 64 are integrated. FIG. 12 is a view that illustrates the configuration of another ebullient cooling device 200 that can be applied to the present invention. As shown in FIG. 12, a level sensor 68 is provided in the gas-liquid separator 16. The level sensor 68 is configured so that a detection portion moves upward and downward in accordance with the liquid level height of the liquid-phase coolant in the gas-liquid separator 16, and by this means the height of the liquid level can be detected in real time.

Further, in the above described embodiment, the temperature measuring portion 54 is provided in the coolant passage 20 at a position that is immediately upstream of the WP 22. However, since another configuration can also be adopted as long as the actual temperature of the liquid-phase coolant that is fed from the WP 22 to the coolant passage 12 can be measured, the temperature measuring portion 54 may be directly attached to the WP 22, or the temperature measuring portion 54 may be provided in the coolant passage 20 at a position that is immediately downstream of the WP 22. Furthermore, the temperature measuring portion 54 may be provided in the coolant passage 18.

In addition, in the above described embodiment, in the control in the boiling mode of the WP 44, the WP 22 is driven in a case where the difference ΔT between the actual temperature $T_2$ and the boiling temperature $T_1$ is equal to or greater than the predetermined temperature $T_3$. The reason for this is that even if the actual temperature $T_2$ exceeds the boiling temperature $T_1$ to some extent, boiling of the liquid-phase coolant in the region that is immediately upstream of the WP 22 will be relatively mild, and the impact thereof on driving of the WP 22 will be small. Another reason is that it is possible to keep the frequency of driving the WP 44 to a minimum and maintain the temperature of the liquid-phase coolant that is fed from the WP 22 to the coolant passage 12 in the vicinity of the boiling point, and as a result it is easier to boil the liquid-phase coolant in the coolant passage 12. However, in a case where the flow rate of the liquid-phase coolant that is fed from the WP 22 to the coolant passage 12 is strictly controlled, it is preferable to set the predetermined temperature $T_3$ to a value that is near to approximately zero, and to drive the WP 22 at frequent intervals in the boiling mode.

The invention claimed is:

1. An ebullient cooling device, comprising:
   a coolant passage that is formed inside an internal combustion engine;
   a gas-liquid separator that separates a coolant that is discharged from the coolant passage into a liquid-phase coolant and a gas-phase coolant;
   a condenser that returns the gas-phase coolant that is separated at the gas-liquid separator to a liquid-phase coolant;
   a first passage that connects the condenser and the coolant passage;
   a second passage that branches from the first passage at a location partway along the first passage, and is connected to the gas-liquid separator;
   a first water pump that is provided between a connection portion that connects the first passage and the second passage, and the coolant passage, and that feeds a liquid-phase coolant from the first passage to the coolant passage during operation of the internal combustion engine;
   a second water pump that is provided between the connection portion and the condenser;
   actual temperature measurement means that is provided in the second passage, or in the first passage between the connection portion and the coolant passage, and is used for measuring an actual temperature of a liquid-phase coolant; and
   an electronic control unit (ECU) including at least an input/output interface, memory, and a CPU, the input/output interface is configured to receive signals from sensors positioned proximate to or on the internal combustion engine, and output signals to actuators positioned proximate to or the internal combustion engine, the ECU programmed to:
      calculate a boiling temperature of a liquid-phase coolant that is fed from the first water pump to the coolant passage based on a pressure of a gas-phase coolant in the gas-liquid separator; and
      in a case where the actual temperature is higher than the boiling temperature, drive the second water pump to feed a liquid-phase coolant from the condenser to the first water pump.

2. The ebullient cooling device according to claim 1, further comprising a recovery device for recovering thermal energy of a gas-phase coolant that is separated at the gas-liquid separator.

3. The ebullient cooling device according to claim 2, further comprising:
   a third passage that connects the gas-liquid separator and the condenser, and that feeds a gas-phase coolant from an upper portion of the gas-liquid separator to the condenser via the recovery means;
   a fourth passage that connects the gas-liquid separator and the condenser, and that feeds a liquid-phase coolant to the condenser from a lower portion of the gas-liquid separator;
   a control valve that is provided in the fourth passage and that opens and closes the fourth passage; and
   the ECU further programmed to, in a case where a liquid level of a liquid-phase coolant in the gas-liquid separator rises to a first position that is lower than a connection location with the third passage and is higher than a connection location with the fourth passage, control the control valve so as to open the fourth passage and feed the liquid-phase coolant from the gas-liquid separator to the condenser.

4. The ebullient cooling device according to claim 3, the ECU further programmed to, in a case where the liquid level of a liquid-phase coolant in the gas-liquid separator decreases to a second position that is below the first position, drive the second water pump to feed a liquid-phase coolant from the condenser to the gas-liquid separator.

5. The ebullient cooling device according to claim 1, wherein the actual temperature measurement sensor is provided in the first passage between the connection portion and the coolant passage.

6. The ebullient cooling device according to claim 1, wherein the ECU drives the second water pump in a case where the actual temperature is higher than the boiling temperature by a predetermined amount or more.

7. An ebullient cooling device, comprising:
   a coolant passage that is formed inside an internal combustion engine;
   a gas-liquid separator that separates a coolant that is discharged from the coolant passage into a liquid-phase coolant and a gas-phase coolant;
   a condenser that returns the gas-phase coolant that is separated at the gas-liquid separator to a liquid-phase coolant;

a first passage that connects the condenser and the coolant passage;

a second passage that branches from the first passage at a location partway along the first passage, and is connected to the gas-liquid separator;

a first water pump that is provided between a connection portion that connects the first passage and the second passage, and the coolant passage, and that feeds a liquid-phase coolant from the first passage to the coolant passage during operation of the internal combustion engine;

a second water pump that is provided between the connection portion and the condenser;

an actual temperature measurement device-that is provided in the second passage, or in the first passage between the connection portion and the coolant passage, and is used for measuring an actual temperature of a liquid-phase coolant;

a boiling temperature calculation device that calculates a boiling temperature of a liquid-phase coolant that is fed from the first water pump to the coolant passage based on a pressure of a gas-phase coolant in the gas-liquid separator; and a coolant feeding device that, in a case where the actual temperature is higher than the boiling temperature, drives the second water pump to feed a liquid-phase coolant from the condenser to the first water pump.

8. The ebullient cooling device according to claim 7, further comprising a recovery device that recovers thermal energy of a gas-phase coolant that is separated at the gas-liquid separator.

9. The ebullient cooling device according to claim 8, further comprising:

a third passage that connects the gas-liquid separator and the condenser, and that feeds a gas-phase coolant from an upper portion of the gas-liquid separator to the condenser via the recovery device;

a fourth passage that connects the gas-liquid separator and the condenser, and that feeds a liquid-phase coolant to the condenser from a lower portion of the gas-liquid separator;

a control valve that is provided in the fourth passage and that opens and closes the fourth passage; and a coolant leak device that, in a case where a liquid level of a liquid-phase coolant in the gas-liquid separator rises to a first position that is lower than a connection location with the third passage and is higher than a connection location with the fourth passage, controls the control valve so as to open the fourth passage and feed the liquid-phase coolant from the gas-liquid separator to the condenser.

10. The ebullient cooling device according to claim 9, further comprising a coolant replenishment device that, in a case where the liquid level of a liquid-phase coolant in the gas-liquid separator decreases to a second position that is below the first position, drives the second water pump to feed a liquid-phase coolant from the condenser to the gas-liquid separator.

11. The ebullient cooling device according to claim 7, wherein the actual temperature measurement device is provided in the first passage between the connection portion and the coolant passage.

12. The ebullient cooling device according to claim 7, wherein the coolant feeding device drives the second water pump in a case where the actual temperature is higher than the boiling temperature by a predetermined amount or more.

* * * * *